United States Patent [19]

Wise

[11] Patent Number: 4,848,605
[45] Date of Patent: Jul. 18, 1989

[54] MOBILE PHARMACEUTICAL HOPPER

[75] Inventor: Thomas W. Wise, Oreland, Pa.

[73] Assignee: Plastech International Inc., Warminster, Pa.

[21] Appl. No.: 35,972

[22] Filed: Apr. 8, 1987

[51] Int. Cl.⁴ .......................................... B65D 88/30
[52] U.S. Cl. .................................. 222/608; 222/183; 222/185; 222/460; 206/508; 206/511; 220/72; 220/469
[58] Field of Search ............... 222/131, 608, 183, 185, 222/462, 460, 540; 414/608; 220/469, 254, 72; 206/508, 511, 512

[56] References Cited

U.S. PATENT DOCUMENTS

| | | | |
|---|---|---|---|
| 3,083,879 | 4/1963 | Coleman | 222/185 X |
| 3,160,326 | 12/1964 | Sturdevant et al. | 222/183 |
| 3,258,178 | 6/1966 | Gran | 220/254 X |
| 3,318,473 | 5/1967 | Jones et al. | 414/608 |
| 3,361,302 | 1/1968 | Berger | 222/608 |
| 3,407,971 | 10/1968 | Oehler | 222/185 |
| 3,602,400 | 8/1971 | Cooke | 222/185 |
| 3,729,121 | 4/1973 | Cannon | 222/185 |
| 3,746,395 | 7/1973 | McClaren | 298/27 |
| 3,759,416 | 9/1973 | Constantine | 206/508 X |
| 3,858,772 | 1/1975 | Myers, Jr. | 222/460 |
| 4,245,685 | 1/1981 | Nemitz et al. | 220/72 X |
| 4,280,640 | 7/1981 | Daloisio | 222/561 |
| 4,397,406 | 8/1983 | Croley | 222/105 |
| 4,398,653 | 8/1983 | Daloisio | 222/185 |
| 4,456,141 | 6/1984 | Pamment | 220/254 X |
| 4,475,672 | 10/1984 | Whitehead | 222/561 |
| 4,591,065 | 5/1986 | Foy | 206/512 X |
| 4,660,724 | 4/1987 | Gaynes | 206/512 X |

FOREIGN PATENT DOCUMENTS

| | | | |
|---|---|---|---|
| 1027128 | 3/1958 | Fed. Rep. of Germany | 220/72 |
| 1333605 | 6/1963 | France | 222/185 |
| 110754 | 4/1961 | Pakistan | 206/508 |

Primary Examiner—Joseph J. Rolla
Assistant Examiner—Steven Reiss
Attorney, Agent, or Firm—John F. A. Earley; John F. A. Earley, III; P. Michael Walker

[57] ABSTRACT

An integral double wall hopper adapted for use in the manufacturing of pharmaceutical tablets comprises an outer shell which forms outer walls, four legs and two runners, and an inner shell which forms inner walls, and has a frustoconical lower portion with a discharge opening molded in the bottom of the frustoconical lower portion. A detachable iris valve is positioned on the discharge opening for opening and closing the discharge opening to dispense the contents of the hopper when desired. The runners allow the tines of a forklift to pick up the hopper from the side without damaging the discharge opening or the detachable iris valve. The hopper includes a cover which has a manway formed therein, a lid for the manway, and a plurality of towers formed on the cover for protecting the manway of a lower stacked hopper and detachable iris of an upper stacked hopper from being damaged by the tines of a forklift when the hoppers are moved. The cover is hinged at one end to allow the hopper to be filled without removing the entire cover. The hopper includes a plurality of recessed thumb and finger holes formed in the walls of the outer shell to make the hopper easy to maneuver without injuring an operator's hands.

12 Claims, 6 Drawing Sheets

MOBILE PHARMACEUTICAL HOPPER

BACKGROUND OF THE INVENTION

1. Field of the Invention

This invention relates to stackable gravity-discharge portable hoppers for handling, storing and dispensing bulk materials, and more particularly concerns hoppers in sanitation-conscious or hygienic environments, for example, for use with dry flowables such as capsules and tablets in the pharmaceutical industry.

2. Description of the Prior Art

Portable or mobile hoppers of the prior art have used a separate base or stand to support stainless steel or, later, a synthetic plastic hopper. Typically, such supporting bases or stands were made of stainless steel. More recently, these supporting stands have been made of molded seamless double wall plastic construction. The two-piece construction of a separate hopper and a separate support base or stand requires that two pieces of equipment must be cleaned, which is time-consuming and expensive.

Another problem with separate hopper and base combinations is that if the hopper-base combinations are stacked four or five high, when an operator of a forklift attempts to move a stacked hopper-base he cannot see the lid or manway of the hopper below, and he has to guess how high he must raise the tines of his forklift to slip under the upper hopper-base and not damage the lid or manway of the lower hopper. The operator may misjudge where to place the tines of his forklift and may damage the lid and manway of the hopper that is underneath the hopper he wishes to move. Also, the forklift operator must judge how far apart to space the tines of his forklift truck so it does not damage the iris valve or slide gate valve that may be located on the bottom of the upper hopper. If the operator of a forklift does not space the tines of his forklift truck far enough apart, the tines may cause damage to the iris valve and may even damage the bottom wall of the upper hopper.

Another problem is that it has been difficult to gain access to the inside of portable hoppers positioned under a machine, such as a coating machine or tablet forming machine, because the only way to gain access to the interior may be through a manway formed in the center of the hopper cover which may be difficult to reach since it is under the center of the machine and may require additional conveyance apparatus.

SUMMARY OF THE INVENTION

An object of this invention is to provide a mobile seamless, one-piece double wall hopper suitable for use with pharmaceutical tablets, capsules, and the like, and which may be used for storage as well as for discharging ingredients from the hopper.

Another object of this invention is to provide a seamless one-piece double wall hopper with a cover that provides for safely and securely stacking the hoppers one upon another, and provides for moving a hopper from the stacked position by a forklift operator without damaging the lid or manway of a lower stacked hopper or the bottom wall or discharge valve of an upper stacked hopper.

Another object of this invention is to provide a hopper that has easy access to its interior from the outside.

Another object of this invention is to provide a hopper which is strengthened by ribs and channels on its exterior walls.

Another object of this invention is to provide a hopper with a cover that may be sealed with tamper-evident seals.

Another object of this invention is to provide a hopper that may be placed on a dolly so the hopper may be easily moved from place to place.

Another object of this invention is to provide a hopper with hand receiving safety structure so that an operator can move from place to place without injuring his hands.

It is another object to make the best use of available floor space by providing a hopper that is self-stacking, so that a specific area of a building does not have to be dedicated for storage and storage racks.

It is also an object to provide a hopper with a low profile so that it may be used with standard pharmaceutical manufacturing equipment. A low profile reduces the risk of crushing soft tablets and capsules in the bottom of the hopper because the head loading is reduced.

DETAILED DESCRIPTION OF THE DRAWINGS

Figure 1:
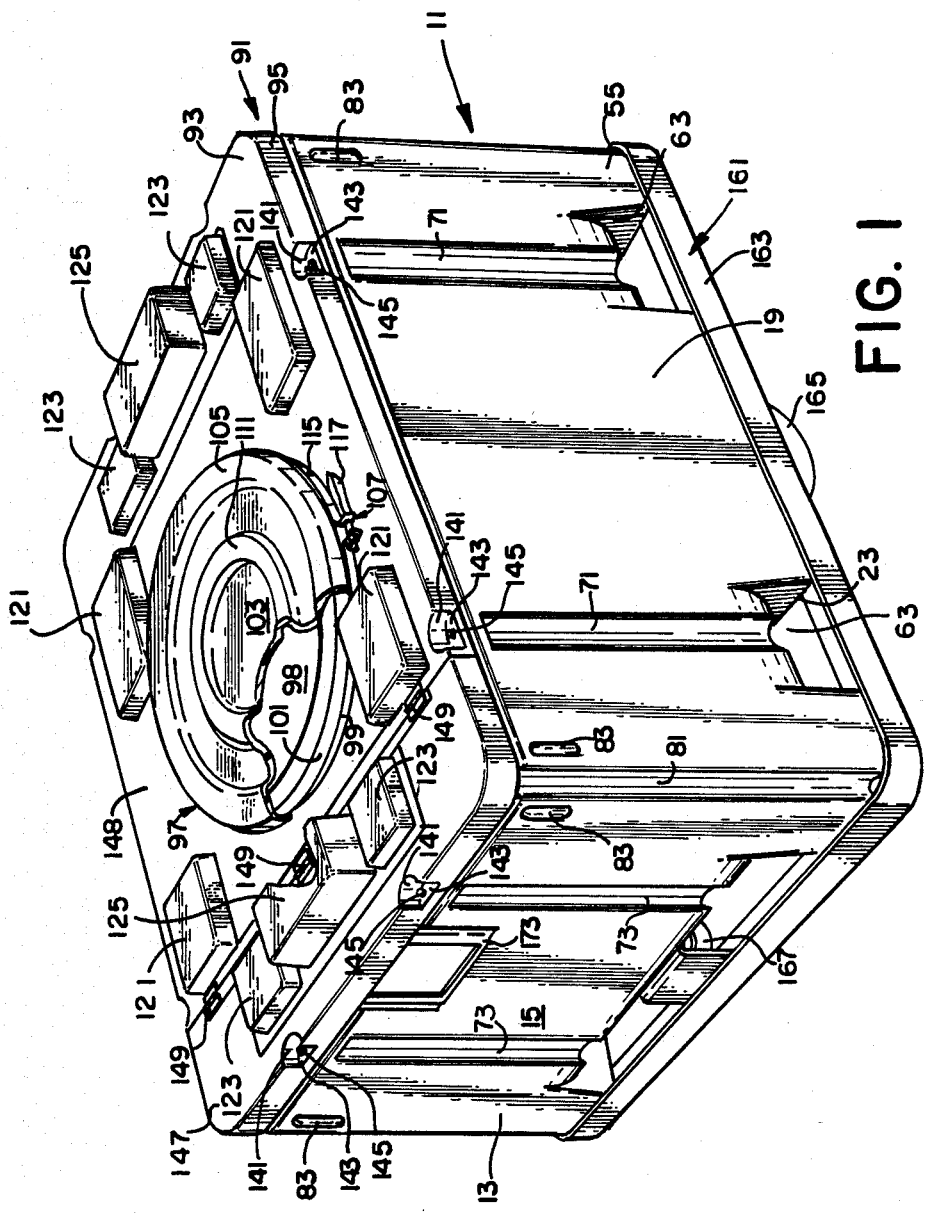
FIG. 1 is a view in perspective of the hopper and cover, with a lever locking lid attached to the cover and the hopper supported by a dolly.
Figure 2:
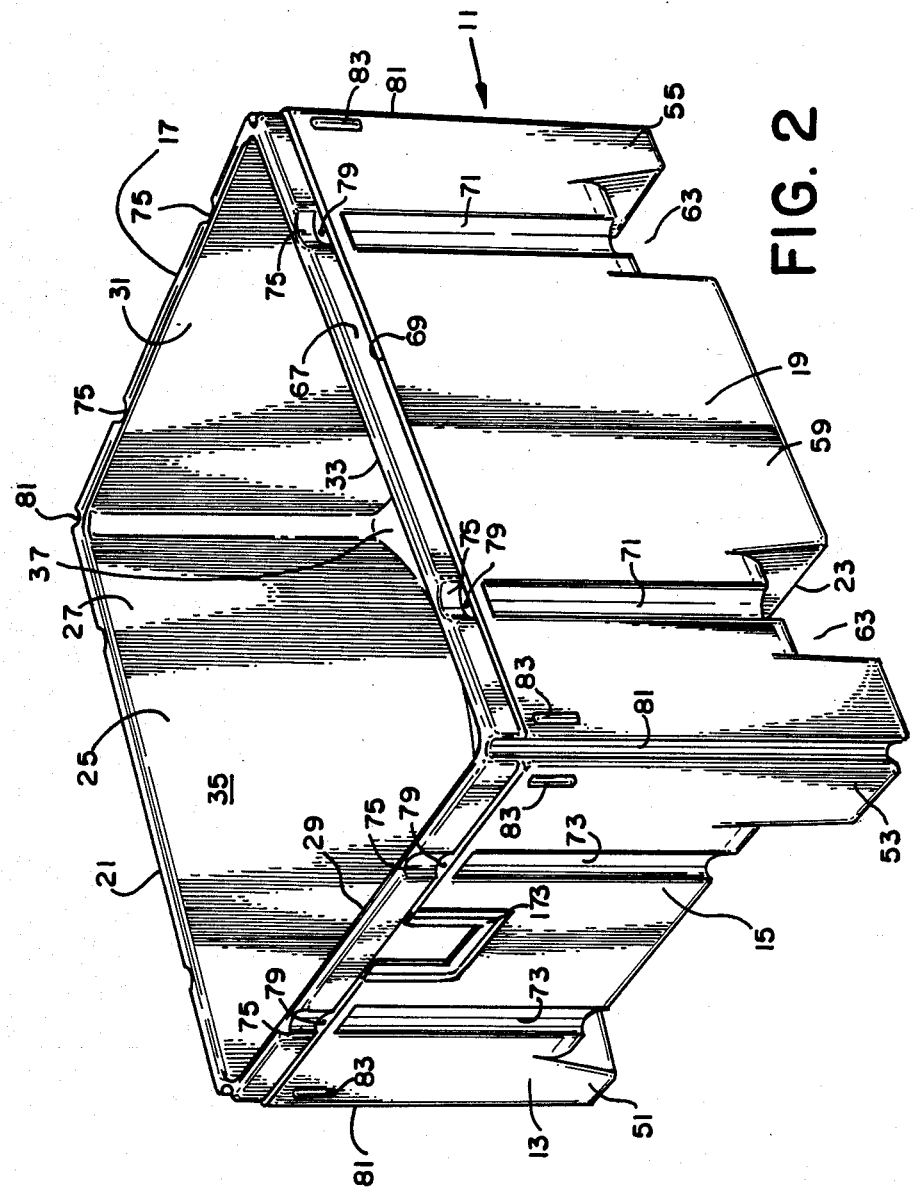
FIG. 2 is a view in perspective of the hopper with the cover removed and without a dolly.
Figure 3:
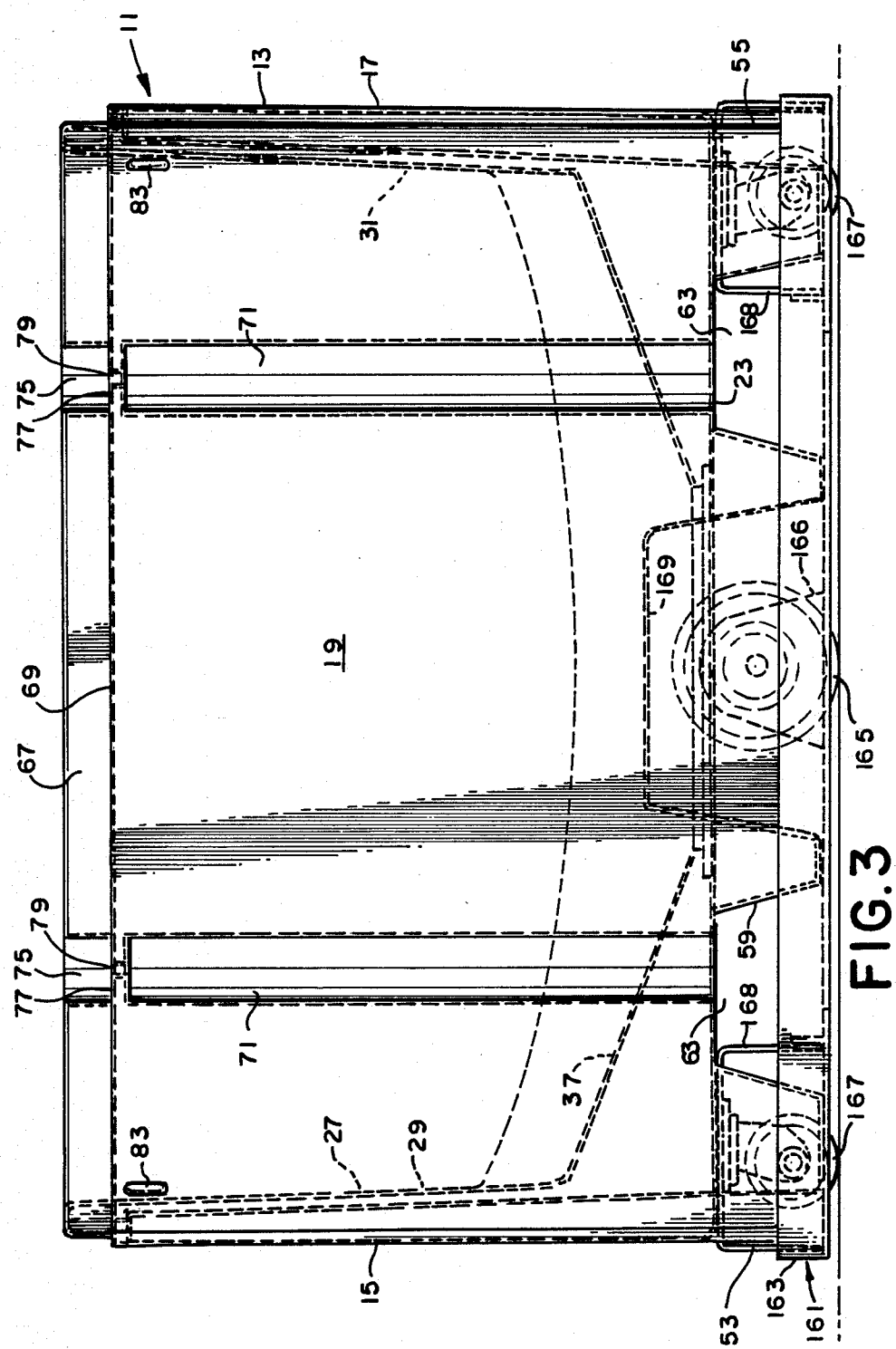
FIG. 3 is a view in side elevation of the hopper.
Figure 4:
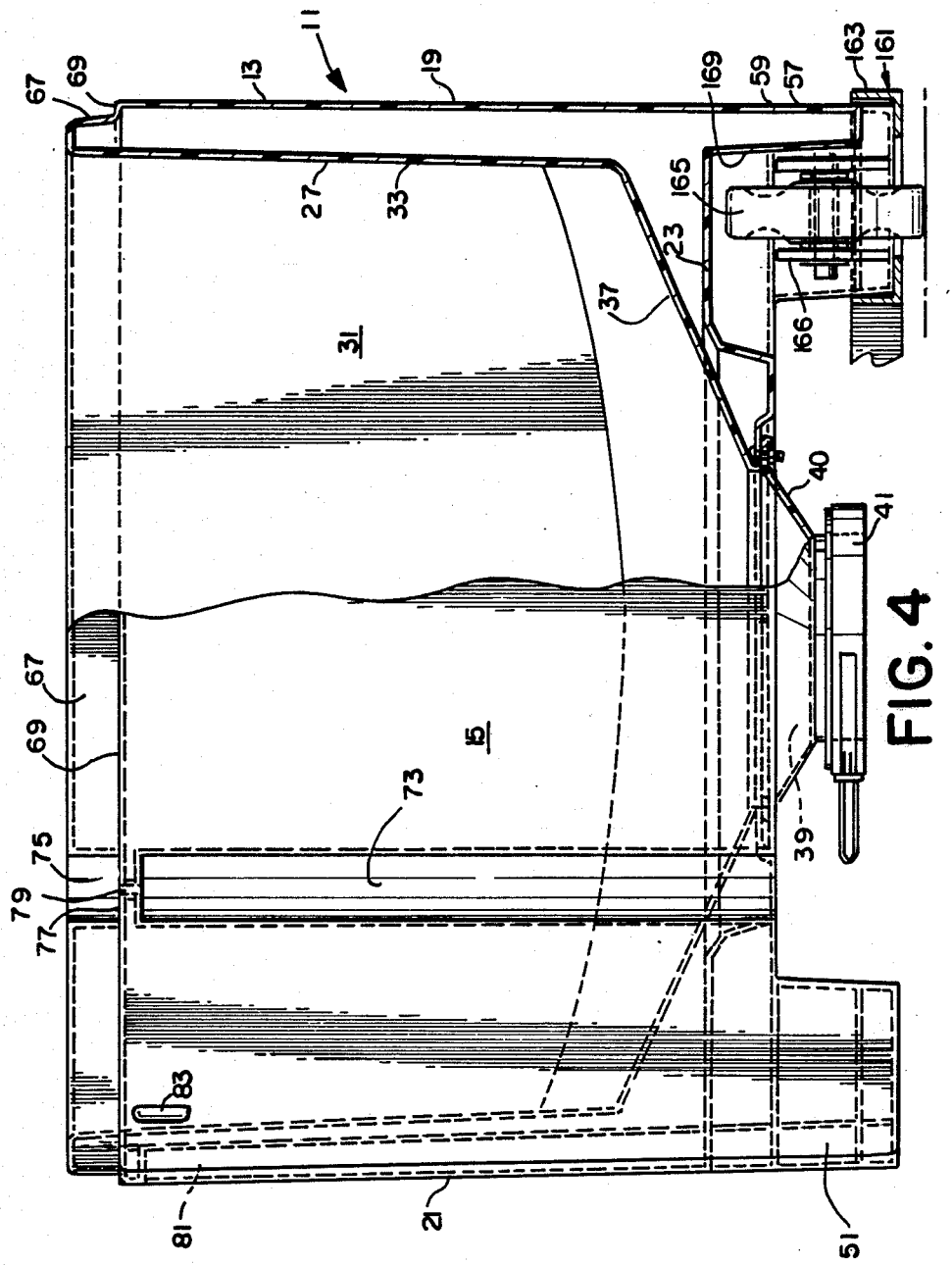
FIG. 4 is a view in front elevation of the hopper.
Figure 5:
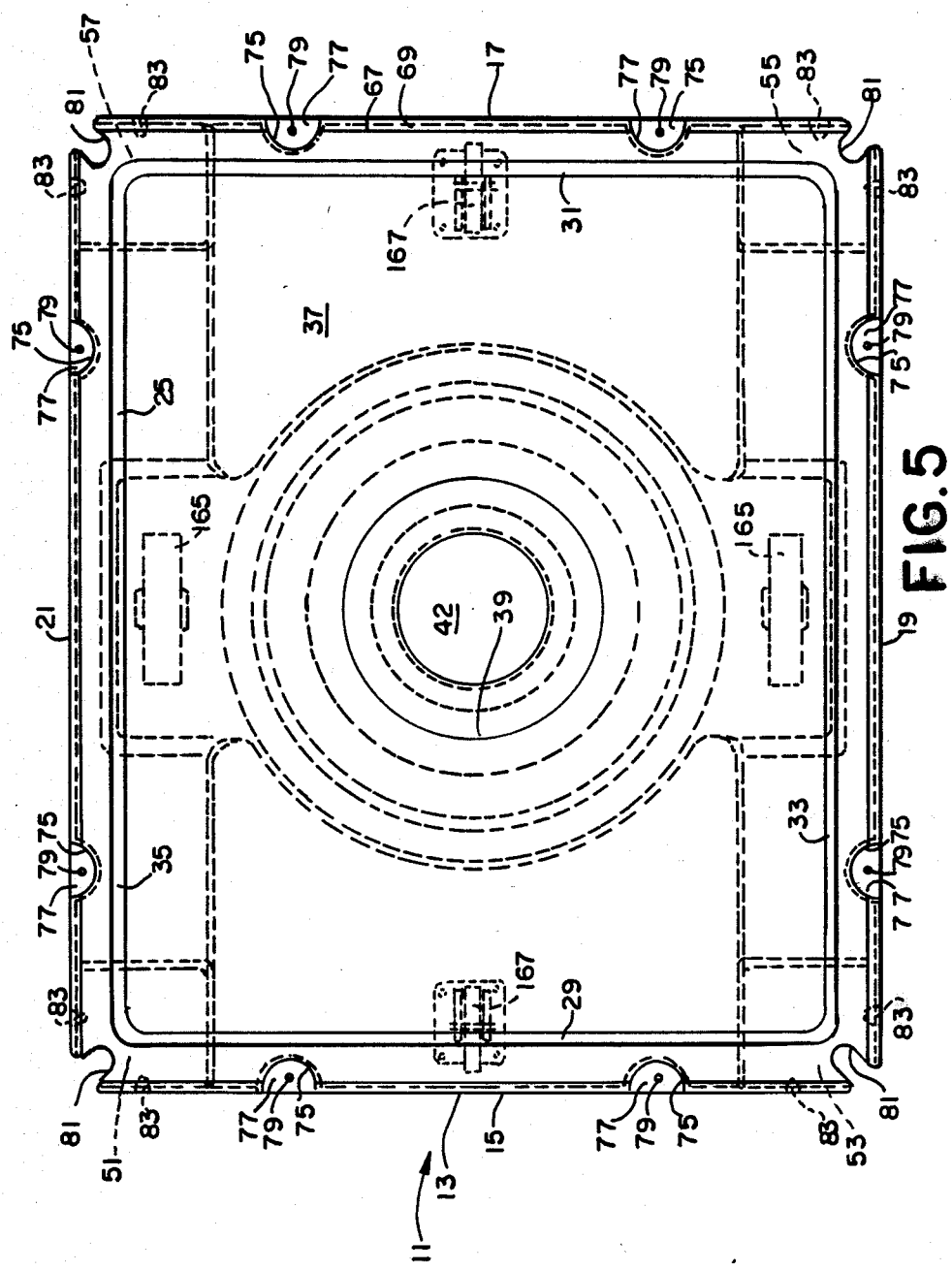
FIG. 5 is a view in top plan of the hopper with the cover removed.

Turning now to the drawings, there is shown an integral double wall hopper 11 which is formed by a rotational molding process that comprises an outer shell 13 with a cylindrical upright wall which may include a front wall 15 and a rear wall 17 connected by a pair of side walls 19, 21, and a bottom panel 23 connecting the bottoms of all the walls. The word cylindrical is used to define hopper walls which may be round, rectangular, or having many sides.

An inner shell 25 is integrally connected to outer shell 13 and also has a cylindrical upright wall which may have a rectangular upper portion 27 including a front wall 29 and rear wall 31 connected by a pair of side walls 33, 35 and a lower frusto conical portion 37 integrally joined to the bottom of the rectangular upper portion 27.

A discharge opening 39 is molded in the bottom of the frusto conical portion 37 of inner shell 25 and the bottom panel 23 of outer shell 13.

A detachable cone 40 having opening 42 is attached to bottom panel 23 of outer shell 13 near discharge opening 39. The slope, altitude, and size of opening 42 of the walls of cone 40 may be changed to vary the clearance between the bottom of cone 40 and the floor.

Detachable closure means such as iris valve 41 is mounted on cone 40 for opening and closing opening 42 to dispense the contents of the hopper 11 when desired at a controlled rate. The size of the discharge may be changed easily by simply detaching cone 40 from discharge opening 39 and attaching a cone 40 with a different size discharge opening 42, and with a different size iris valve 41. Valve 41 may have six inch, eight inch, or ten inch diameter outlets to accommodate the mass, particle size and funnel flow characterisitics of the products in the hopper. For example, you may wish to increase the outlet diameter to prevent the bridging of a powder.

Outer shell bottom panel 23 includes downwardly extending legs 51, 53, 55, 57, one in each corner, which form support members for the hopper 11.

The outer shell bottom panel 23 further includes a pair of parallel spaced apart runners 59. One runner 59 is formed at the base of side wall 19 and is spaced away from legs 53 and 55 to form two openings or channels 63. Similarly, the other runner 59 is formed at the base of outer shell side wall 21 and is spaced away from legs 51 and 57 to form two openings or channels 63. Openings 63 are wide enough to admit the tines of a forklift truck or pallet jack when it is desired to lift or move the hopper 11. Further, runners 59 are placed to block the tines and protect the cone 40 and valve 41 from being struck by the tines and damaged. The openings 63 guide the tines away from the cone 40 and valve 41.

Hopper 11 is integral and is one-piece and is made of a synthetic plastic, preferably polyethylene, by a rotational molding process.

A top portion of outer shell front wall 15, rear wall 17 and side walls 19, 21 is recessed inwardly to form cover engaging upright rim 67 and ledge 69.

A pair of ribs 71 are formed in outer shell side walls 19, 21 and a pair of ribs 73 are formed in outer shell front wall 15 and rear wall 17. The ribs 71, 73 are semicircular in shape and are recessed into the outer shell 13. Ribs 71 extend from the top of side wall openings 63 to a point below ledge 69, and ribs 73 extend from the bottom of outer shell front wall 15 and rear wall 17 to a point below ledge 69.

Upper ribs 75 are formed in cover engaging rim 67 of outer shell 13 at positions that correspond to side wall ribs 71 and front and rear wall ribs 73, forming shoulders 77 in the outer shell 13 at points between side wall ribs 71 and ribs 75, and front and rear wall ribs 73 and ribs 75. Shoulders 77 have openings 79 formed therein to allow passage of a bolt or wire of a tamper evident seal.

Handle means are also provided for moving or pushing the hopper when desired without exposing the fingers or thumbs of an operator's hands to injury, and the handle means comprises upright channels 81 formed in each corner of outer shell 13 and extending for the entire vertical height thereof, and thumb slots 83 formed in outer shell 13 at a point below ledge 69 and near channels 81 so that an operator can insert his fingers in channels 81 and his thumb in thumb hole 83. Channels 81 also form a column to provide additional strength for the outer shell 13 to support hoppers 11 when they are stacked one upon another.

A main cover 91 adaptable to fit hopper 11 is provided, and it includes flat surface or portion 93 and lip or skirt portion 95.

Flat portion 93 has a circular manway 97 formed therein, which is defined by opening 98, neck 99 and rim 101. Manway rim 101 extends vertically above the plane of flat portion 93, and is formed at the top of manway neck 99. Manway rim 101 also extends outwardly from manway neck 99 so that a lever locking apparatus 103 may be secured to manway 97.

Lever locking lid apparatus 103 comprises a synthetic plastic lid 105, and a separate lever locking apparatus or ring 107. Lid 105 includes a lid rim which fits over manway rim 101, and a center portion 111 with a raised circumferential ridge formed therein, which adds to the strength and rigidity of lid 105 but does not exceed the height of lid rim.

Lever locking ring 107 is made of metal, and includes a channel portion 115 with the channel legs positioned above the top of the lid rim and below the bottom of manway rim 101 when lid 105 is placed upon manway 97. When the lever locking apparatus channel portion 115 is so positioned, lever lock 117 may be closed to secure lid 105 to manway 97. Lever locking apparatus 107 is adaptable to include a tamper evident seal.

Figure 6:
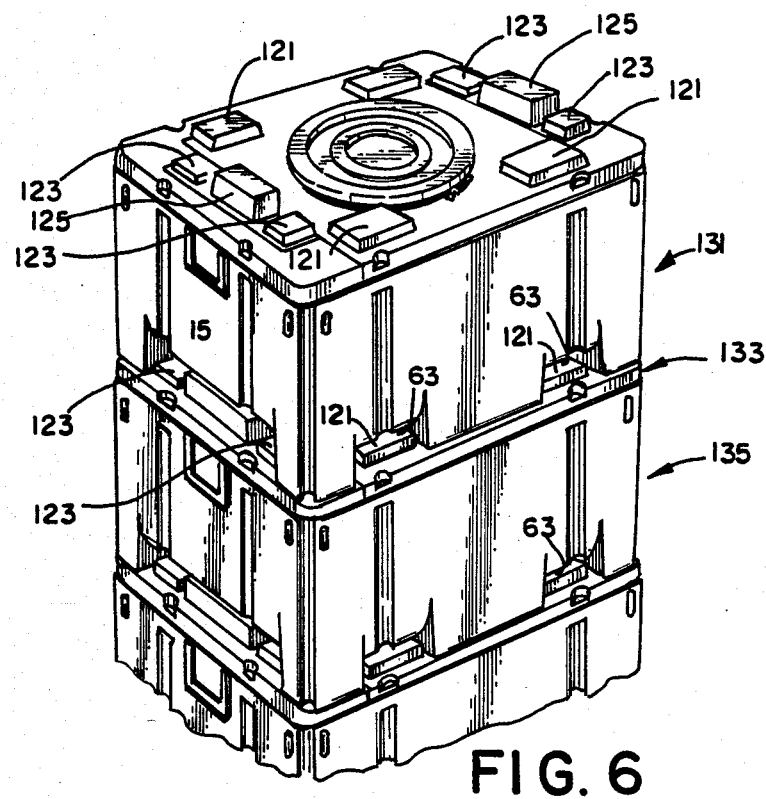
FIG. 6 is a view in perspective of hoppers stacked one upon another.

Cover 91 is provided with side towers 121 and end towers 123 which rise vertically above flat portion 93 for a distance slightly greater than the vertical distance from the cover flat portion 93 to the top of lever locking lid 103. The tops of side towers 121 and end towers 123 are coplanar, and are positioned around the perimeter of flat portion 93 so that when another hopper 11 is stacked on cover 91, side towers 121 are positioned in openings 63 between legs 53, 55 and runner 59, and between legs 51, 57 and runner 59, and abut, or nearly abut, legs 51, 53, 55, 57 and runners 59. End towers 123 are positioned on cover 91 so that when another hopper 11 is stacked on cover 91, end towers 123 abut, or nearly abut, legs 51, 53 at the base of outer shell front wall 15, and abut legs 55, 57 at the base of outer shell rear wall 17. Referring to FIG. 6, it may be seen that when an upper hopper 131 is stacked on cover 133 of lower hopper 135, side towers 121 and end towers 123 of cover 133 prevent lateral movement of upper hopper 131.

Further, side towers 121 and end towers 123 of cover 91 serve the additional function of preventing the tines of a forklift from damaging the manway 97 or lever locking lid apparatus 103 when moving a hopper 11 from one place to another. Referring again to FIG. 6, it may be seen that if an operator desired to move upper hopper 131 from its stacked position on top of lower hopper 135, the operator would have to raise the tines of his forklift to a point above the side towers 121 and end towers 123 in order to insert the intes beneath hopper 131 but above towers 121, 123 of hopper 135. Because towers 121, 123 are higher than lever locking lid apparatus 103, when lever locking lid apparatus 103 is secured to manway 97, the manway 97 and lever locking lid apparatus 103 are not damaged by the tines of a forklift when upper hopper 131 is moved.

Cover 91 further includes a pair of spacing towers 125 formed on flat portion 93 and positioned at opposite ends of cover 91 near the front wall 15 and rear wall 17 of outer shell 13 and between end towers 123. Spacing towers 125 are high enough above flat portion 93 so that when a hopper 11 is stacked on cover 91, the spacing towers 125 nearly abut the bottom of outer shell front wall 15 and outer shell rear wall 17 of the upper hopper 11. Spacing towers 125 are wide enough so that when the tines of a forklift are inserted underneath outer shell front wall 15 or outer shell rear wall 17 the tines do not strike and damage discharge cone 40 or iris valve 41. Referring again to FIG. 6, it may be seen that if a forklift operator desires to remove upper hopper 131 from its stacked position on top of cover 133 of lower hopper 135, he may insert the tines of the forklift from the outer shell front wall 15 side or outer shell rear wall 17 side but must space the tines of his forklift sufficiently far apart to slide by both sides of spacing towers 125.

In the perimeter of cover 91, cover ribs 141 and cover rib shoulders 143 are formed and positioned to correspond to top ribs 75 and shoulders 77 of outer shell 13 of hopper 11. When cover 91 is placed on hopper 11, lip portion 95 of cover 91 securely engages rim 67 until the bottom of cover lip 95 abuts ledge 69 of hopper 11. Further, cover ribs 141 and cover rib shoulders 143 fit into and slidably engage top ribs 75 and shoulders 77 of hopper 11, thus insuring a snug fit of cover 91 on hopper 11. Ledges 143 of cover 91 include openings 145 formed therein, so that a tamper evident seal may be placed through cover rib ledge opening 145 and ledge opening 79 of outer shell 13 to allow detection of a break of the seal and unauthorized entry into hopper 11.

Cover 91 is preferably formed in two separate parts, as shown in the drawings, a hinged portion 147 and a main portion 148. Hinged portion 147 is connected to main portion 148 by hinges 149. Hinged portion 147 preferably includes two end towers 123 and a spacing tower 125.

Figure 7:
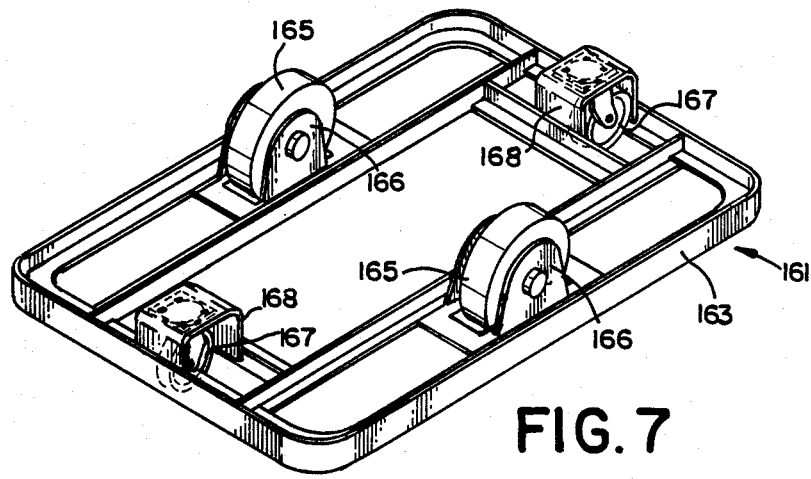
FIG. 7 is a view in perspective of a dolly adapted for use with the hopper.

Hopper 11 is also adaptable to be used with a dolly 161. As shown in FIG. 7, dolly 161 comprises a frame 163 made of angle iron, a pair of wheels 165 mounted on wheel supports 166 that are attached to opposite sides of frame 163, and a pair of casters 167 mounted on caster supports 168 at the front and rear end of dolly frame 163. The wheels 165 and casters 167 are positioned in this pattern, commonly known as a diamond pattern, to allow dolly 161 to rotate about a point. Outer shell wheel wells 169, 171 are formed in the bottom of runners 59 to allow free movement of wheels 165 when the hopper 11 is moved from place to place on dolly 161. Legs 51, 53, 55, 57 of hopper 11 fit snugly into dolly frame 163, and the bottom of outer shell front wall 15 and rear wall 17 abuts the top of dolly caster supports 168.

Instead of lever locking lid apparatus 103, cover 91 may be provided with a dust cover that fits securely over rim 101 of manway 97, but is not locked thereon. Also, the cover 91 may itself be replaced by a dust cover which protects the contents of the hopper but does not provide for stacking.

Front wall 15 of outer shell 13 may include a molded cardholder 173 to allow the insertion of a card identifying the contents of hopper 11.

In operation, hopper 11 is placed on dolly 161. Cover 91 is placed on top of hopper 11 and pressed down so that lip portion 95 of cover 91 slidably contacts cover engaging rim 67 and comes to rest upon ledge 69 of hopper 11. Manway 97 is open, and hopper 11 is filled with dry flowables such as capsules or tablets through manway 97. If hopper 11 has been filled through manway 97, lid 105 is placed on manway 97 and slidably engages rim 101. Lid 105 is secured to manway rim 101 by placing lever locking apparatus 107 around lid 105 and manway rim 101 and closing lever lock 117.

An operator may push the filled hopper 11 from place to place by inserting his fingers in channels 81 and his thumbs in thumb slots 83 and pushing the hopper 11 and dolly 161 from place to place.

Hopper 11 may be emptied by positioning cone opening 42 of hopper 11 over the container in which the contents of hopper 11 are to be emptied, and opening iris valve 41.

Stacked hoppers 131, 135, as shown in FIG. 6, may be moved from the stacked position by inserting forklift tines above side towers 121 of lower stacked hopper 135 and through openings 63. Also, an operator may move a stacked hopper 131 from stacked hopper position on top of hopper 135 by inserting his forklift tines above end towers 123 and on both sides of spacing towers 125 of cover 91 of the lower stacked bin 135, and lifting the upper hopper 131 by elevating the tines.

ADVANTAGES

The new integral double wall hopper 11 is actually an integral hopper and base combination. Although especially adapted for pharmaceutical use, it may be used in other fields for the storage and transmission of granular materials, as in the food industry and the chemical industry.

In the hopper 11 of the present invention, the double-wall construction provides an interior shell which a frusto-conical converging hopper wall section which is adapted to direct flowable materials to the discharge opening, and the exterior shell creates the framing and stacking structure of the hopper. The hopper 11 is shown as being rectangular in horizontal cross-section, but it may be square or circular, if desired.

The detachable cone 40 at opening 39 provides flexibility for varying the size and diameter of the valve 41, and also for varying the height between the valve and the floor line. Also, a different type of valve, such as a slide-gate valve, could be installed instead of the iris valve 41 which is commonly used in the pharmaceutical industry to vary the flow of the ingredients being discharged from the hopper.

The main cover 91 is removable. This is important when the hopper 11 is positioned under a tablet coating machine which discharges the coated tablets from a rotating pan that sprays them widely. If the main cover 91 were not removed, many of the coated tablets would bounce off the main cover 91 and would bounce all over the floor.

The manway 98 is molded into the top of main cover 91 to provide for quick inspection of the product in the hopper 11 without requiring the removal of main cover 91.

Hinged cover portion 148 also provides for a quick inspection of the product without withdrawing the hopper 11 completely from under a machine from which it is receiving the product.

Hopper 11 provides for four-way forklift entry, and two-way pallet jack entry because the space between pallet jack tines may not be varied.

Hoppers 11 are particularly adapted for use in the preparation of pharmaceutical products. Hoppers 11 may be used to transport, store, and discharge various intermediate products and the final products. For example, a hopper 11 may receive a product from a blending machine, store the product, discharge the product into a granulating machine, store the granulated product, discharge the granulated product into a compression machine which compresses the granulated product into a compressed tablet. A hopper 11 may then directly receive the compressed tablets from the tabletting machine, store the tablets, and transport and discharge the tablets into a coating machine and be elevated by a forklift truck for direct discharge into the coating pans. Coated tablets may be discharged directly into a hopper 11, with its main cover 91 removed. This is advantageous over the conventional method of discharging the coated tablets into a pan, and then pouring the tablets from the pan into a 55 gallon drum. The coated tablets and hopper 11 may then be transported to other manufacturing areas for imprinting, storage, or packaging.

The hopper 11 includes a low profile which enables it to be used with most tabletting machines, a fully removable main cover which offers a wide opening for use in receiving tablets from bottom or front discharge coating pans, and a hinged fold-back cover portion 147 which is adapted for filling the hopper without completely removing the main cover, in some situations. Hopper 11 may be transported to various production areas by forklift truck, pallet jack, or by a stainless steel dolly 161.

Hopper 11 is molded from FDA approved resin, with no liner required, has a working capacity of 20 cubic feet, and has provisions for tamper evident seals. It is also provided with an integral card holder for positive product identification, and a completely removable main cover for easy cleaning, and for use with bottom discharge coating pans.

A lid 105 and a hinged cover portion 147 provide easy access for sampling of the contents. Hopper 11 includes a molded-in pallet base, so that no separate pallet is required.

Hoppers 11 may be securely stacked four-high when full, or six-high when empty for optimal use of warehouse space.

The one-piece, double wall, structure of hopper 11 has advantages. It is less expensive to manufacture than to make a separate hopper with a separate base, because the integral hopper and base of hopper 11 is made in one molding operation instead of in two. Also, the one-piece hopper 11 is easier to clean than a separate hopper and a separate base.

Many pharmaceutical products are sensitive to light, so it is conventional to use stainless steel as the material for containers for pharmaceutical products, because stainless steel is opaque. However, single wall containers made of synthetic plastic may not be opaque, depending upon the amount of color contained in the plastic. However, the double wall of hopper 11 supplies opacity and protects the contents of hopper 11 from any damage which may be caused by light.

Also, the double wall of hopper 11 is very much stronger than a hopper having a single wall, and this is important, for example, for strength in stacking.

The channels 81 in the corners of hopper 11 provide a stacking column that is stronger than a simple corner. The weight of an upper hopper is born on the corners of the lower hopper, and the channels 81 strengthen those corners. The channels 81 also provide a hand safety grip.

In the protection of pharmaceutical forms, the pharmaceutical manufacturer may use a number of hoppers 11 instead of using an assortment of drums, hoppers, and pans which may require man-handling by the operator.

I claim:
1. An integral double wall hopper comprising
an outer shell including a cylindrical upright wall and a bottom panel,
an inner shell having a cylindrical upright wall with a frusto conical lower portion,
said outer and inner shells being integrally molded together to form the integral double wall hopper,
said outer and inner shells forming an upper tank portion and a lower tank portion which are integrally molded together to form the hopper which is integral and one-piece,
a discharge opening molded in the center of the bottom of the frusto conical lower portion of the inner shell and in the bottom panel of the outer shell,
closure means positioned on the discharge opening for opening and closing the discharge opening to dispense the contents of the hopper when desired,
said outer shell bottom panel including four downwardly extending legs forming supporting members for the hopper,
said outer shell bottom panel further including runner means for protecting the closure means from being struck by the tines of a forklift truck,
said runner means including a pair of spaced apart runners extending downwardly from opposed sidewalls and forming spaces which allow the entrance of the tines of a forklift truck to pick up the hopper,
said runners having a protective portion with a width substantially equal to or greater than the diameter of the discharge opening and closure means and positioned in front of said discharge opening and closure means for blocking and protecting the discharge opening and closure means from the tines of a forklift as they pick up the hopper.

2. An integral double wall hopper comprising
an outer shell including a cylindrical upright wall and a bottom panel,
an inner shell having a cylindrical upright wall with a frusto conical lower portion,
a discharge opening molded in the center of the bottom of the frusto conical lower portion of the inner shell and in the bottom panel of the outer shell,
closure means positioned on the discharge opening for opening and closing the discharge opening to dispense the contents of the hopper when desired,
said outer shell bottom panel including four downwardly extending legs forming support members for the hopper,
a plurality of spaced apart ribs formed in the front and rear wall and side walls of the outer shell for stiffening the outer shell,
said ribs including a shoulder portion with an opening formed therein.

3. The hopper of claim 2, wherein said hopper further includes
a plurality of handle means formed in the outer shell for gripping and maneuvering the hopper without causing injury to the operator's hands and for creating a column for stacking strength.

4. The hopper of claim 3, wherein
said handle means includes a channel formed in the outer shell at each corner of the hopper, with sufficient depth for inserting fingers,
and a plurality of thumb holes formed in the walls of the outer shell for inserting a thumb therein.

5. An integral double wall hopper comprising
an outer shell including a cylindrical upright wall and a bottom panel,
an inner shell having a cylindrical upright wall with a frustoconical lower portion,
a discharge opening molded in the center of the bottom of the frustoconical lower portion of the inner shell and in the bottom panel of the outer shell,
closure means positioned on the discharge opening for opening and closing the discharge opening to dispense the contents of the hopper when desired, said outer shell bottom panel including four downwardly extending legs forming supporting members for the hopper, a main cover adapted to fit over and cover the top of the hopper, said cover including a flat portion, a downwardly extending lip portion connected to the flat portion which forms a secure fit with the hopper when placed thereon, a manway formed in said flat portion, said manway being adaptable to be covered with a lid, a plurality of towers formed in said flat portion and extending vertically upwardly from the flat portion for a distance at least as high as the vertical projection of the lid above the flat portion, said towers being positioned around the perimeter of said flat portion so that when another hopper is stacked on the cover the downwardly extending legs and runners of the upper hopper rest on the flat portion of the cover, and the towers abut said legs and runners to prevent lateral movement of said upper stacked hopper on said cover, a pair of spacing towers formed in said flat portion of the cover at opposite ends of the cover nearest the front and rear walls of the outer shell, said spacing towers being wide enough so that tines of a forklift must be spaced apart for a distance such that they cannot damage the closure means of an upper stacked hopper, said spacing towers being high enough to prevent the tines of a forklift from being inserted into the vertical space between said projections and the bottom of the front and rear walls of the outer shell of the upper stacked hopper.

6. The hopper of claim 5, wherein said lip portion of the cover includes a plurality of spaced apart ribs formed therein at positions corresponding to the ribs formed in the hopper shoulders, whereby when a cover is placed on a hopper, the ribs of the cover securely fit into the ribs of the hopper.

7. The hopper of claim 5, including lever locking lid means for locking the lid to the cover.

8. The hopper of claim 5, wherein said lid is a dust cover.

9. The hopper of claim 5, wherein said flat portion of the cover is hinged at one end to allow a portion of said cover to be raised to give access to the contents of the hopper without removing the entire cover.

10. The hopper of claim 5, wherein transport means is provided for transporting the hopper from place to place.

11. The hopper of claim 10, wherein said transport means includes a dolly with a pair of wheels and a pair of casters.

12. An integral double wall hopper comprising an outer shell having a cylindrical upright wall including a front and a rear wall connected by a pair of side walls and a bottom panel connecting the bottoms of the walls, an inner shell having a cylindrical upright wall with a rectangular upper portion including a front and rear wall connected by a pair of side walls, and a frusto conical lower portion, a discharge opening molded in the center of the bottom of the frusto conical lower portion of the inner shell and in the bottom panel of the outer shell, detachable closure means positioned on the discharge opening for opening and closing the discharge opening to dispense the contents of the hopper when desired at a controlled rate of flow, said outer shell bottom panel including four downwardly extending legs forming supporting members for the hopper, said outer shell bottom panel further including a pair of spaced apart runners spaced between said downwardly extending legs along the outer shell side walls for blocking and protecting the discharge opening and closure means from the tines of a forklift as they pick up the hopper from the side, whereby said hopper forms an integral one-piece double-wall unit for tablets, powders and the like, a main cover adapted to fit over and cover the top of the hopper, a plurality of spaced apart ribs formed in the front and rear wall and side walls of the outer shell for stiffening the outer shell, said ribs including a shoulder portion with an opening formed therein, said hopper further including a plurality of handle means formed in the outer shell for gripping and maneuvering the hopper without causing injury to the operator's hands and for creating a column for stacking strength, said handle means including a channel formed in the outer shell at each corner of the hopper, with sufficient depth for fingers to be inserted therein, and a plurality of thumb holes formed in the walls of the outer shell for inserting a thumb therein, said main cover including a flat portion, a downwardly extending lip portion connected to the flat portion which forms a secure fit with the hopper when placed thereon, a manway formed in said flat portion, said manway being adaptable to be covered with a lid, a plurality of towers formed in said flat portion and extending vertically upwardly from the flat portion for a distance at least as high as the vertical projection of the lid above the flat portion, said towers being positioned around the perimeter of said flat portion so that when another hopper is stacked on the cover the downwardly extending legs and runners of the upper hopper rest on the flat portion of the cover, and the towers abut said legs and runners to prevent lateral movement of said upper stacked hopper on said cover, a pair of spacing towers formed in said flat portion of the cover at opposite ends of the cover nearest the front and rear walls of the outer shell, said spacing towers being wide enough so that tines of a forklift must be spaced apart for a distance such that they cannot damage the closure means of an upper stacked hopper, said spacing towers being high enough to prevent the tines of a forklift from being inserted into the vertical space between said projections and the bottom of the front and rear walls of the outer shell of the upper stacked hopper, said lip portion of the cover including a plurality of spaced apart ribs formed therein at positions corresponding to the ribs formed in the hopper, whereby when a cover is placed on a hopper, the ribs of the cover securely fit into the ribs of the hopper, said flat portion of the cover being hinged at one end to allow a portion of said cover to be raised to give access to the contents of the hopper without removing the entire cover, transport means for transporting the hopper from place to place, said transport means comprising a dolly with a pair of spaced apart wheels and a pair of spaced apart coasters.

* * * * *